United States Patent [19]

Böttner et al.

[11] 4,126,361

[45] Nov. 21, 1978

[54] LARGE ANTIFRICTION BEARING COMPOSED OF SEGMENTS

[75] Inventors: Manfred Böttner; Wilhelm Schlüter, both of Dortmund, Fed. Rep. of Germany

[73] Assignee: Hoesch Werke Aktiengesellschaft, Dortmund, Fed. Rep. of Germany

[21] Appl. No.: 844,124

[22] Filed: Oct. 20, 1977

[30] Foreign Application Priority Data

Oct. 21, 1976 [DE] Fed. Rep. of Germany ....... 2647588

[51] Int. Cl.² ............................................. F16C 33/60
[52] U.S. Cl. .................................... 308/174; 308/6 R; 308/236
[58] Field of Search .............................. 308/174–176, 308/3 A, 6, 219, 236, 216, 235, 182, 227–231, 207

[56] References Cited

U.S. PATENT DOCUMENTS

| | | | |
|---|---|---|---|
| 2,917,351 | 12/1959 | Franke et al. | 308/174 |
| 3,361,500 | 1/1968 | Pohler | 308/216 |

OTHER PUBLICATIONS

German Periodical "Der Maschinenmarket," 65th Year, Issue 30/31 of Apr. 17, 1959.

Primary Examiner—Trygve M. Blix
Assistant Examiner—Douglas C. Butler
Attorney, Agent, or Firm—Walter Becker

[57] ABSTRACT

A large antifriction bearing composed of a plurality of segments for absorbing forces generating axial, radial and pitching forces, in which each of the individual segments is formed by two bearing ring segments. Within the region of the roller path of the large antifriction bearing one bearing ring segment has a cross section of a substantially one-piece T-shaped profile, whereas the other bearing ring segment in cross section is designed as a U-shaped profile partially surrounding the flange of the T-shaped profile. Holding ring segments are detachably connected to the the ends of the two free legs of the U-shaped profile and extend into the region of the web of the T-shaped profile. The bearing ring segments which abut each other and form the large antifriction bearing are guided by runningpath wires inserted into the bearing ring segment and bridging the areas abutting each other.

6 Claims, 2 Drawing Figures

LARGE ANTIFRICTION BEARING COMPOSED OF SEGMENTS

The present invention relates to an antifriction bearing composed of segments for absorbing forces which generate axial, radial and pitching moments while the individual segments are formed of two annular bearing segments supported through the intervention of antifriction bodies.

Large antifriction bearings of this type are employed preferably in large implements, such as dredges, cranes and aerials, and the like. In this connection the design using segments is selected when either the machining possibilities for undivided bearing rings are practically no longer feasible or when the undivided bearing rings have such a size that they can no longer be economically transported.

Pat. No. 115,590 of the German Democratic Republic deals with the machining of bearing ring segments of the above mentioned type. The roller path arrangement of large antifriction bearings composed of segments corresponds to that of undivided bearings. The typical mounting for a heavy-duty roller bearing is disclosed in German Offenlegungsschrift 2 011 141.

With the customary roller path arrangements for absorbing forces generating axial, radial and pitching moments, the connecting structures connected to the individual bearing rings are mounted on and connected to the outer and inner rings along two different diameters. As a result thereof, torsional forces are generated in the bearing rings the major portion of which is absorbed by inner tensions and therefore, with undivided bearing rings, do not produce any material drawbacks. However, with bearing rings composed of individual ring segments, these forces have to be absorbed at the mutual abutting areas of the individual bearing ring segments by corresponding torsional elements in order to avoid any gaps between the abutting areas. The arrangement of such connecting elements within the region of a common abutting section of two bearing ring segments automatically increases the volume of the material and the overall volume of the structure, which is undesirable with regard to the bearing structure as an entity.

It is, therefore, an object of the present invention to provide a large antifriction bearing with as small an overall volume as possible.

It is a further object of this invention to provide a large antifriction bearing composed of segments with as great as possible a rigidity of the bearing ring segments against bending in axial direction while simultaneously avoiding a "breathing" at the abutting areas.

It is also an object of the present invention to avoid a weakening of the material within the region of the abutting areas as it would occur, for instance, by the arrangement of additional guiding elements of customary design, as for instance the employment of pins or wedges. In other words, the employment of such additional elements provided exclusively for guiding purposes should as far as possible be avoided.

These and other objects and advantages of the invention will appear more clearly from the following specification in connection with the accompanying drawings, in which.

Figure 1:
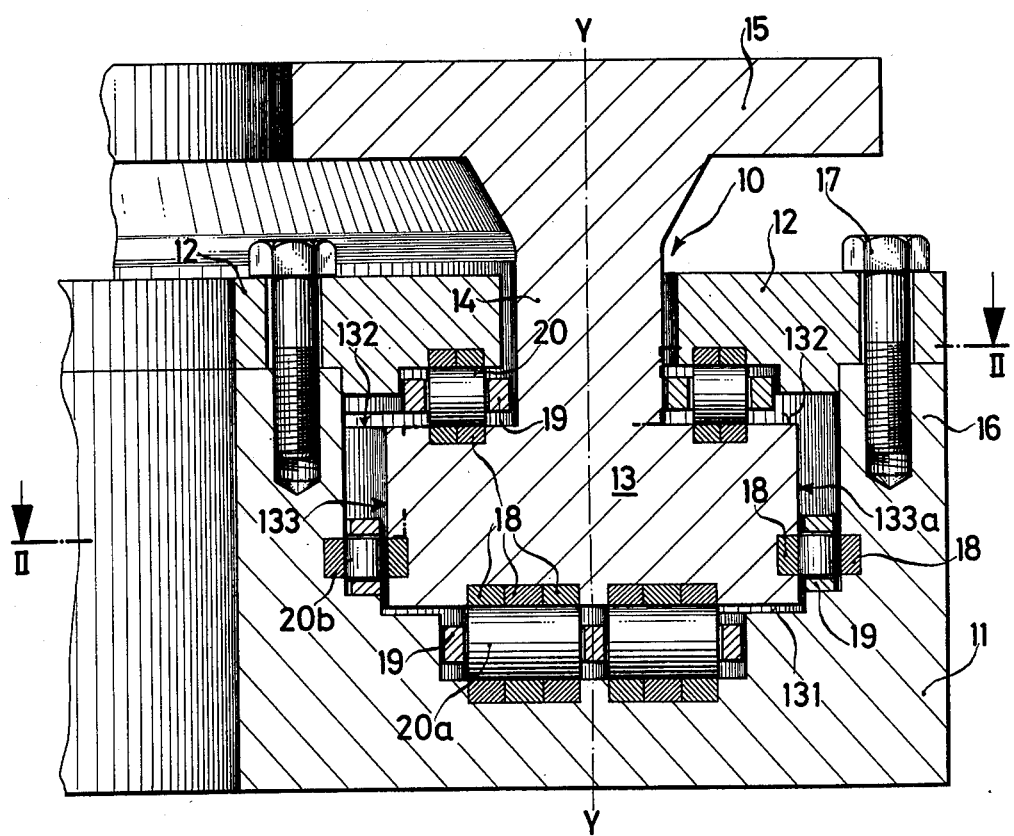
FIG. 1 represents a cross section through a segment according to the invention composed of two segmental bearing ring sections, said section being taken along the line I—I of FIG. 2.
Figure 2:
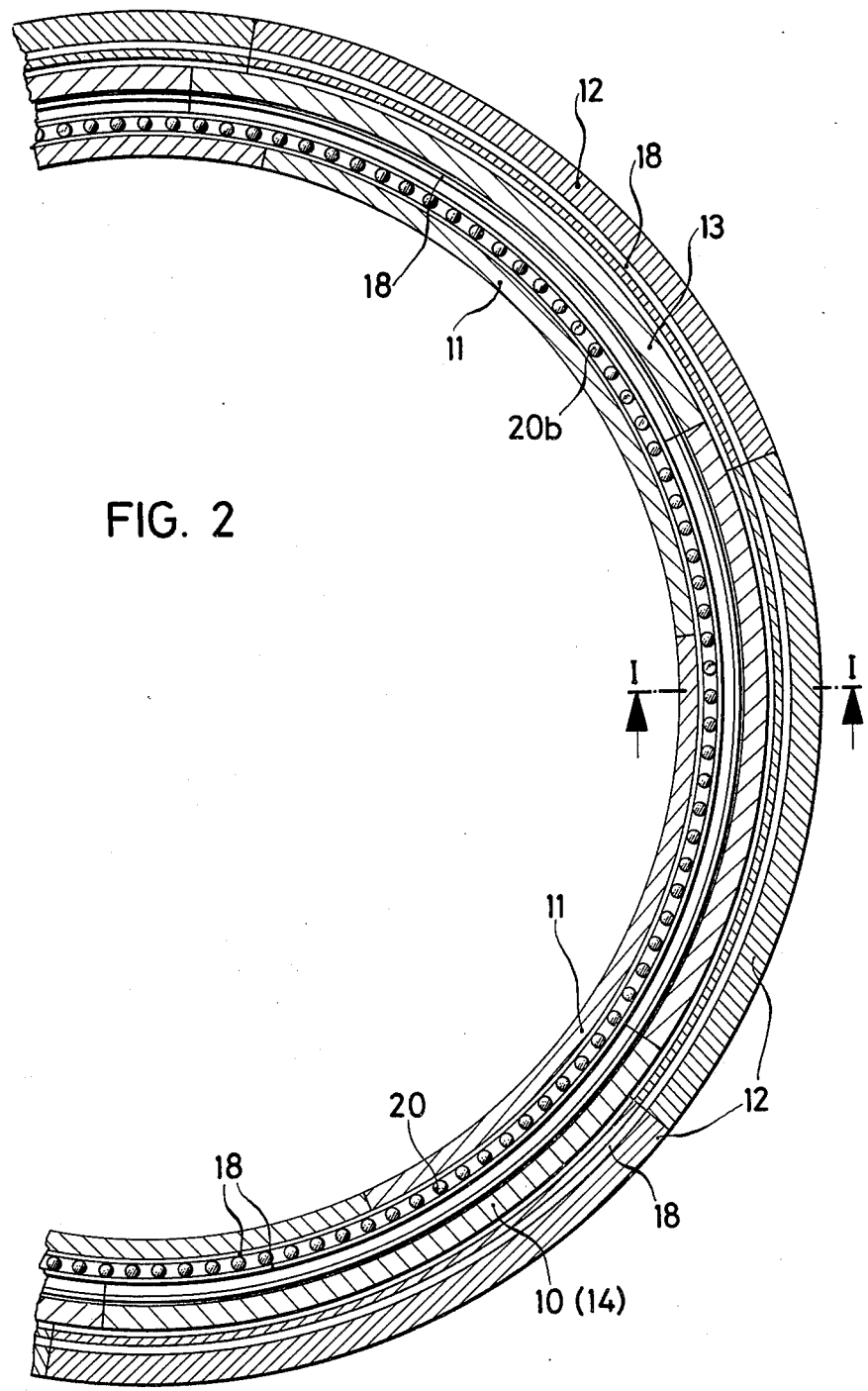
FIG. 2 represents a section taken along the line II—II of FIG. 1 and shows a portion of a large antifriction bearing composed of a plurality of segments, while the section through the connecting screws extending through the holding ring segments has been omitted.

The large antifriction bearing according to the present invention is composed of a plurality of segments for absorbing forces generating axial, radial and pitching moments, and is characterized primarily in that in the region of the roller path one bearing ring segment has a cross section of a substantially one-piece T-shaped profile, whereas the other bearing ring segment in cross section is designed as a one-piece U-shaped profile which partially surrounds the flange of the T-shaped profile. At the end of the two free legs of the U-shaped profile there are detachably connected holding ring segments extending into the region of the web of the T-shaped profile. The bearing ring segments which abut each other and form the large antifriction bearing are guided by wires which are inserted in a manner known per se into the bearing ring segments and bridge the abutting areas.

According to a further feature of the invention the numbers of the bearing ring segments having a T-shaped cross section as well as the numbers of the bearing ring segments having a U-shaped cross section and the numbers of the holding ring segments differ from each other.

The positively inserted rectangular wires are symmetrically arranged with regard to each other with reference to the Y-axis of the bearing ring segment having the T-shaped cross section, the Y-axis corresponding to the central rolling path diameter, the wires for the axial rows of rollers being inserted along the outer surface and along the two inner surfaces of the flange which are separated by the web, whereas the wires for the radial rows of rollers are embedded along the two lateral surfaces of the flange.

The large antifriction bearing according to the present invention brings about that the introduced forces do no longer result in torsional forces in the bearing ring segments. The connecting structures are mounted on the same diameter.

The above mentioned wires which bridge the abutting areas and are positively inserted into the bearing ring segments at the same time perform the function of the heretofore provided additional guiding elements. As a result thereof, the overall structural volume of the antifriction bearing is reduced, especially within the region of the roller path. In this connection it is advantageous that the bearing ring segment which has the T-shaped cross section as well as the U-shaped bearing ring segment which has the U-shaped cross section are subdivided. Due to this design the resistance moment against bending in axial direction is increased so that the bending of the bearing ring segments, when the antifriction bearing is under axial load, is reduced and a relief of the connection at the abutting areas is realized.

The arrangement of two radial roller paths at both sides of the lateral surfaces of the flange on the T-shaped bearing ring segment further reduces the forces to be conveyed to the abutting areas of the segments, even when radial forces are introduced. With a bearing segment according to the present invention the radial forces are transferred from one bearing ring segment radially mounted on both sides to the other bearing ring segment while, due to the one-piece design of the bearing ring segment having a U-shaped cross section, the bearing ring section of U-shaped cross section will not yield radially. The radial forces in the bearing ring segments do not produce tensile stresses or compression stresses.

With an undivided large antifriction bearing the redundancy of determination of the mearurements of two radial roller paths which are located concentrically with regard to each other and which act in opposite direction with regard to each other has a disadvantageous effect upon the rotational resistance or the bearing play. This drawback is avoided with a large antifriction bearing composed of segments in conformity with the present invention.

Due to the elimination of additional guiding elements, at the abutting areas, the machining is greatly simplified. For instance the drilling and milling of bores or slots is no longer necessary. Furthermore, there has been realized the known advantage of wire antifriction bearings in which the bearing rings can be made of softer material and do not have to be heat treated as it is necessary with ordinary bearings subjected to higher loads. The elimination of the heat treatment is of particular advantage. Especially with segment-shaped divided bearing rings a heat treatment would result in considerable deformation. Above all, the surface hardening which is necessary for conventional bearings becomes superfluous with bearings according to the present invention.

Referring now to the drawings in detail, the large antifriction bearing illustrated therein and composed of segments is primarily subjected to axial load. More specifically, a segment of the large antifriction bearing according to the invention is composed of a bearing ring segment 10 which has a one-piece T-shaped cross-sectional profile. The antifriction bearing furthermore comprises a second bearing ring segment 11 of a one-piece U-shaped cross-sectional profile. The antifriction bearing according to the present invention also comprises holding ring segments 12. The individual segments 10, 11 and 12 have a different length so that the numbers of the bearing ring segments (T-profile) 10 and the numbers of the bearing ring segments (U-profile) 11 as well as the numbers of the holding ring segments 12 are different. In the illustrated example the large antifriction bearing comprises six bearing ring segments 10, five bearing ring segments 11 and six holding ring segments 12. The number of the holding ring segments 12 need not correspond to the number of the bearing ring segments 10 or of the bearing ring segments 11.

Each bearing ring segment 10 which in the region of the roller path is T-shaped comprises a flange 13 and a web 14 and with regard to the connecting structure for the segments, which is not illustrated, has for instance a further flange 15 so that the shape of an I-profile is obtained. This I-profile is not under all circumstances necessary for the bearing ring segment but depends on the respective design of the connecting structure which may also permit other shapes.

The flange 14 is partially embraced by the bearing ring segment 11 of U-shaped profile. The ends of the free arms of the bearing ring segment 11 serve as supports for the holding ring segments 12 which by means of screws 17 are detachably connected to the bearing ring segment 11 of U-shaped profile.

Running path wires 18 of rectangular cross section which are positively inserted into the bearing ring segments 10 and 11 serve as raceways or running pahts for the antifriction bodies 20, 20a and 20b.

The running paths are equipped with one or more rows with running path wires depending on the magnitude of the load expected to act upon the bearing.

The arrangement of the wires 18 with regard to each other is symmetrical with respect to the Y-axis of the bearing ring segment 10 having a T-shaped cross section, the Y-axis corresponding to the central diameter of the running path.

For the axial rows of rollers 20a the wires 18 are inserted as supporting race ways - in two rows - along the outer surface 131 at the central diameter of the running path, and as holding race ways are arranged symmetrically along the two inner surfaces 132 of the flange 13 which are separated by the web 14 in conformity with the holding ring segments 12 extending into the region of the web 14. The wires 18 for the radial rows of rollers 20b are arranged along the two lateral surfaces 133 of the flange 13 while being embedded in the surfaces 133. In some instances a plurality of wires 18 are located in a recess adjacent to each other while being inserted corresponding to their length in such a way that, when placing the individual segments adjacent to each other so as to form a large antifriction bearing, the abutting areas of two segments are bridged by the wires.

It may be mentioned that the connection of the segments to each other has not been shown and described because the connection of the individual segments to each other is known per se and may be effected in any convenient manner. Thus, for instance, the German periodical "Der Maschinenmarkt" 65th year, Issue 30/31 of Apr. 17, 1959, describes a segmental bearing in which the individual segments are joined by screws to form a ring.

It is, of course, to be understood that the present invention is by not means limited to the specific showing in the drawings but also comprises any modifications within the scope of the appended claims.

What is claimed is:

1. A large antifriction bearing comprising race rings composed of interconnected segments, in which each individual segment includes: a first bearing ring segment having a substantially one-piece T-shaped cross section with a top flange and a bottom section and a web section connecting said top flange to said bottom section; and also includes a second bearing ring segment of a substantially U-shaped cross section partially surrounding said bottom section of said T-shaped cross section of said first bearing ring segment; said large antifriction bearing also including holding ring segments detachably connected to the respective second bearing ring segments of U-shaped cross section and extending into the region of said web of said first bearing ring segments; race wires embedded in said first and second bearing ring segments and in said holding ring segments; and rotatable antifriction bodies interposed between and in rolling engagement with the pertaining race wires in said first and second bearing ring segments and said holding ring segments, said race wires bridging the abutting areas of the respective adjacent bearing ring segments.

2. An antifriction bearing according to claim 1, in which said first bearing ring segments and said second bearing ring segments and said holding ring segments differ in number from each other.

3. An antifriction bearing according to claim 1, in which said race wires have a rectangular cross section and are positively respectively inserted in said first bearing ring segments and said second bearing ring segments and said holding ring segments.

4. An antifriction bearing according to claim 1, in which said race wires are arranged symmetrically to each other with regard to the central axis of each cross section of the pertaining first and second bearing ring segments and pertaining holding ring segment in their assembled position.

5. An antifriction bearing according to claim 1, in which said antifriction bodies include radial antifriction bodies and axial antifriction bodies.

6. An antifriction bearing according to claim 5, in which said bottom section of the T-shaped cross section of each first bearing ring segment forms a bottom flange having a radially inner and a radially outer surface and also having an upper and a lower surface and in which the race wires for said axial antifriction bodies are arranged along said upper and lower surfaces of said bottom flange whereas the race wires for said radial antifriction bodies are arranged along said radially inner and outer surfaces of said bottom flange.

* * * * *